(12) United States Patent
Paganini et al.

(10) Patent No.: US 8,568,080 B2
(45) Date of Patent: Oct. 29, 2013

(54) METHOD AND DEVICE FOR FORMING PACKAGES OF PRODUCTS ARRANGED IN SUPERPOSED LAYERS

(75) Inventors: Livio Paganini, Ferrara (IT); Nicola Giuliani, Castello di Serravalle (IT)

(73) Assignee: KPL Packaging S.p.A., Calderara di Reno (BO) (IT)

( * ) Notice: Subject to any disclaimer, the term of this patent is extended or adjusted under 35 U.S.C. 154(b) by 472 days.

(21) Appl. No.: 12/734,495

(22) PCT Filed: Nov. 4, 2008

(86) PCT No.: PCT/IT2008/000689
§ 371 (c)(1),
(2), (4) Date: Jun. 29, 2010

(87) PCT Pub. No.: WO2009/060490
PCT Pub. Date: May 14, 2009

(65) Prior Publication Data
US 2010/0287885 A1  Nov. 18, 2010

(30) Foreign Application Priority Data
Nov. 6, 2007 (IT) ................ FI2007A0246

(51) Int. Cl.
*B65G 57/09* (2006.01)
*B65G 57/32* (2006.01)
*B65B 31/00* (2006.01)
*B65B 25/14* (2006.01)

(52) U.S. Cl.
USPC ............... 414/797.7; 414/789.8; 198/418.4

(58) Field of Classification Search
USPC ........ 198/369.2, 418.2–418.4, 435, 448–449; 271/9.01; 414/788.4, 789.6, 789.8, 414/790.9, 791, 791.1, 791.4, 791.6, 792.6, 414/792.8, 794.7, 794.9, 795, 795.2, 795.3, 414/797.5, 797.9; 53/152–153, 247, 447, 53/473, 540–541
See application file for complete search history.

(56) References Cited

U.S. PATENT DOCUMENTS

| | | | | |
|---|---|---|---|---|
| 4,679,379 A | * | 7/1987 | Cassoli | 53/438 |
| 5,038,549 A | * | 8/1991 | Nordstrom | 53/447 |
| 5,185,988 A | * | 2/1993 | Cunningham | 53/436 |

(Continued)

FOREIGN PATENT DOCUMENTS

| EP | 0 679 579 A1 | 11/1995 |
|---|---|---|
| EP | 1 366 993 A1 | 12/2003 |

(Continued)

*Primary Examiner* — Gregory Adams
(74) *Attorney, Agent, or Firm* — Breiner & Breiner, L.L.C.

(57) ABSTRACT

The device includes a stacking surface movable in a substantially vertical direction, on which layers of products to be packaged are superposed, and a pair of conveyors substantially superposed to feed the layers of products to the stacking surface. The device also includes a pair of walls substantially parallel, and substantially vertical, between which the layers of products are inserted by the conveyors when they are stacked on the stacking surface. The walls move reciprocally towards and away from each other to take a position of greater reciprocal distance, in which they do not interfere with the products deposited on the stacking surface, and a position of lesser reciprocal distance, in which they interfere with the products inserted therebetween.

13 Claims, 2 Drawing Sheets

(56) References Cited

U.S. PATENT DOCUMENTS

| | | |
|---|---|---|
| 5,433,063 A * | 7/1995 | Kovacs et al. .................... 53/550 |
| 5,794,417 A * | 8/1998 | Mohrman ....................... 53/541 |
| 6,397,567 B1 * | 6/2002 | Focke et al. .................... 53/541 |
| 2005/0132671 A1 * | 6/2005 | Cinotti ............................ 53/531 |
| 2007/0107385 A1 * | 5/2007 | Dall'omo et al. ............... 53/433 |
| 2010/0014953 A1 * | 1/2010 | Antoniazzi et al. ........ 414/789.5 |
| 2010/0287885 A1 * | 11/2010 | Paganini et al. ................ 53/447 |

FOREIGN PATENT DOCUMENTS

| | | |
|---|---|---|
| EP | 1535844 A1 * | 6/2005 |
| EP | 1 775 222 A1 | 4/2007 |
| WO | WO 2006/134622 A2 | 12/2006 |
| WO | WO 2006/134622 A3 | 12/2006 |

* cited by examiner

METHOD AND DEVICE FOR FORMING PACKAGES OF PRODUCTS ARRANGED IN SUPERPOSED LAYERS

TECHNICAL FIELD

The present invention relates to improvements to machines or devices for the ordered arrangement of products destined for packaging. More in particular, the present invention relates to a device for the formation of mutually superposed layers of products to be packaged, such as rolls of toilet paper, packs of napkins or the like.

STATE OF THE ART

In the tissue paper converting industry, to produce for example toilet paper, kitchen towels, paper napkins and handkerchiefs or the like, there is frequently the need to produce packages of several products arranged according to superposed layers. A plurality of superposed layers of rolls, packs of napkins or the like are packaged with heat-sealable plastic films, to form packages destined for sale.

WO-A-2006/134622 discloses devices and methods for the production of groups of three superposed layers of products for packaging. In these devices alignment and compacting of the products formed in single layers is critical, as incorrect alignment of the products causes defects during subsequent packaging or even jamming of the packaging lines downstream of the layering device.

OBJECTS AND SUMMARY OF THE INVENTION

According to one aspect, the invention provides measures to solve or alleviate the aforesaid problems. In one embodiment, the invention provides a device for the formation of mutually superposed layers of products to be packaged, comprising a stacking surface movable in a substantially vertical direction, on which layers of products to be packaged are superposed, and a pair of substantially superposed conveyors to feed the layers of products to the stacking surface. The device also comprises a pair of substantially parallel and substantially vertical walls, between which the layers of products are inserted by means of the conveyors, when they are stacked on said stacking surface. The walls move reciprocally towards and away from each other to take a position of greater reciprocal distance, in which they do not interfere with the products placed on the stacking surface, and a position of lesser reciprocal distance, in which they interfere with the products inserted therebetween. In this way, when the stacking surface is lowered with the first number of layers (e.g. one or two layers) deposited thereon, the subsequent layer or layers are carried above the stacking surface without reciprocal sliding with respect to the products below, already positioned on the stacking surface. Consequently, interference between the layers and possible slight misalignments are prevented, or differences in level between products of the layer below do not interfere with the movement of the upper layers.

According to a further aspect, the invention relates to a method for stacking layers of products to be packaged, comprising the steps of:
placing a first number of layers of products on a stacking surface;
lowering the stacking surface;
positioning, above the first number of layers of product, a second number of layers of products, maintaining them raised from the layer of products below by a distance sufficient to prevent sliding on the products below stacked on the stacking surface.

Further advantageous features and embodiments of the method and of the device according to the invention are indicated in the appended claims and will be described in greater detail below with reference to accompanying drawings.

BRIEF DESCRIPTION OF THE DRAWINGS

The invention will be better understood by following the description and accompanying drawing, which shows non-limiting practical embodiments of the invention. More in particular, in the drawing.

DETAILED DESCRIPTION OF EMBODIMENTS OF THE INVENTION

The present invention can be incorporated in a device designed and controlled as described in WO-A-2006/134622, which should be referred to for greater details, for the part not described in the present disclosure, which is limited to the innovative and characterizing aspects of the present invention.

Figure 2:
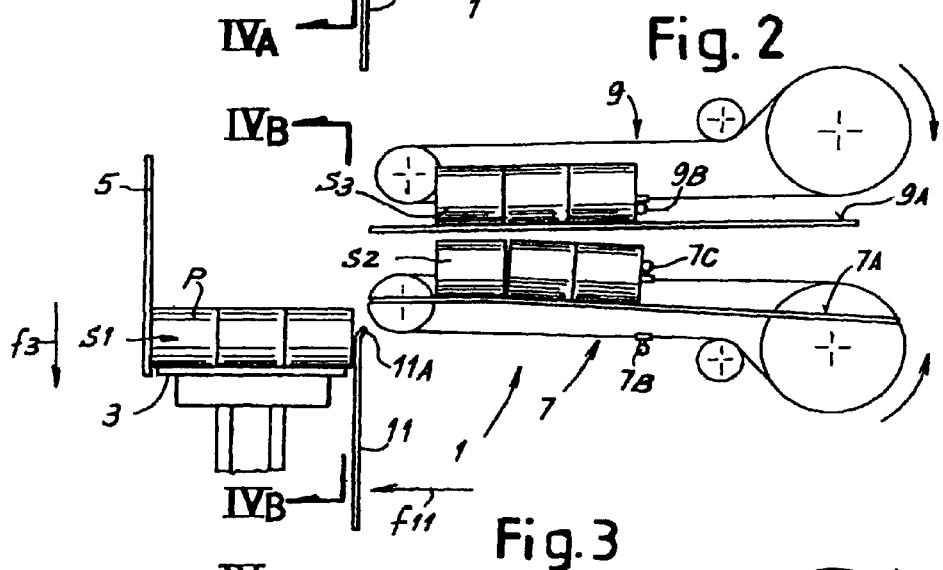

With reference to the accompanying figures, the device, indicated as a whole with 1, includes a stacking surface 3 movable vertically according to the arrow f3 (FIG. 2). A fixed stop wall 5 is associated with the stacking surface to define the position of complete insertion of layers S of products P, in the embodiment illustrated formed by way of example of rolls of toilet paper or the like.

In the example shown, three layers, indicated with S1, S2, S3, are arranged on the stacking surface 3, each comprising four rows of three products P. However, it must be understood that other configurations are possible, with a different number of products for each layer and also, if necessary, a different number of mutually superposed layers.

To stack the layers S1, S2, S3 on the vertically movable stacking surface 3 the device includes a pair of substantially superposed conveyors: a first lower conveyor 7 and a second upper conveyor 9. A sliding surface 7A is associated with the lower conveyor 7, along which the layers S of products P are pushed by means of the conveyor 7. For this purpose, the conveyor 7 includes transverse push bars 7B, 7C. In a practical embodiment the conveyor 7 is formed by two endless flexible members substantially parallel and distanced by a degree sufficient to contain therebetween the layers to be stacked and which support the transverse push bars 7B, 7C.

The upper conveyor 9 has a similar structure, with a sliding surface 9A and with a single push bar 9B carried by two endless flexible members (for example a belt or a chain), which form the conveyor 9.

In some embodiments, a compacting wall 11, extending substantially vertically, is arranged under the sliding surface 7A of the lower conveyor 7. In some embodiments, the compacting wall 11 is provided with a movement according to the arrow f11 (FIG. 2).

Figure 4A:
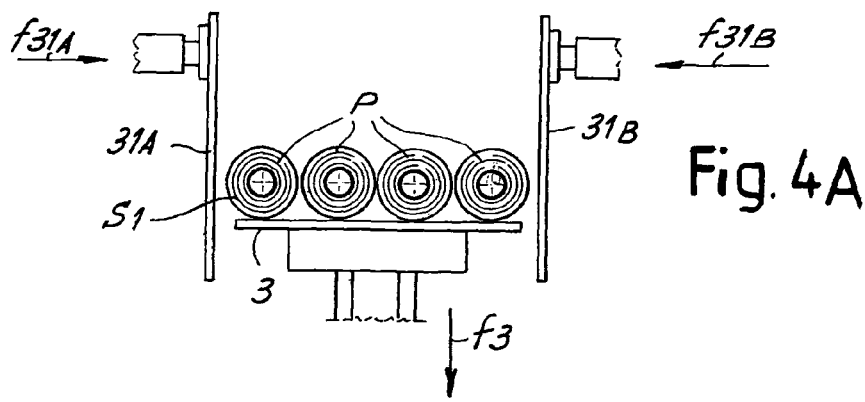
FIGS. 4(a)-4(c) shows views according to IVa-IVa, IVb-IVb and IVc-IVc of FIGS. 1, 2, 3 respectively.
Figure 4B:
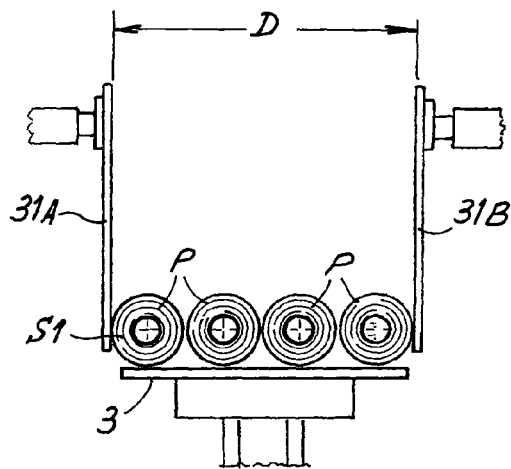
Figure 4C:
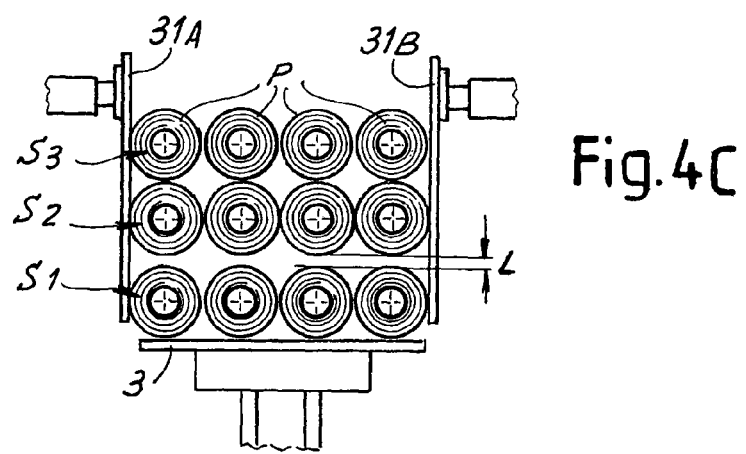

Moreover, according to the invention, a pair of opposite walls 31A, 31B (FIGS. 4A-4C) are arranged at the sides of the stacking surface 3, provided with a relative movement towards and away from said surface, according to the arrows f31. The function of these moving walls is to prevent reciprocal sliding between the layers that are superposed in sequence on the stacking surface 3 according to the methods described below with reference to an operating cycle.

Figure 1:
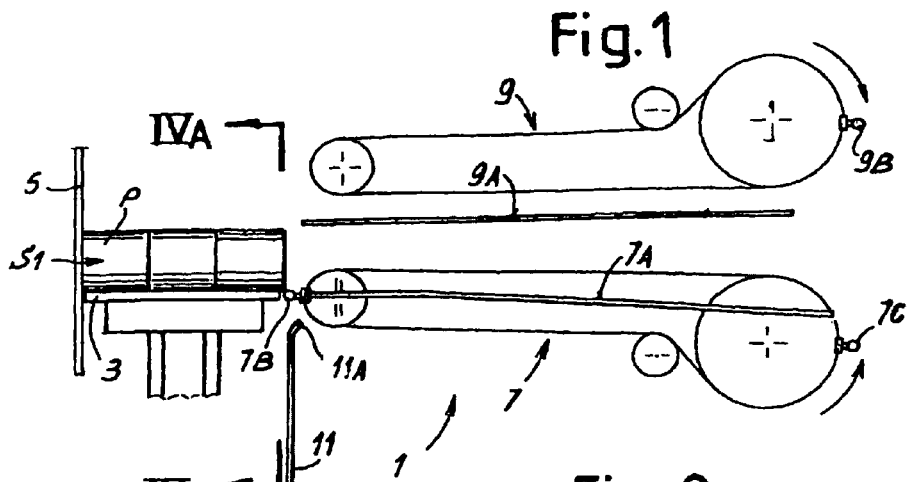
FIGS. 1 to 3 show an operating sequence in a simplified schematic representation of the device according to the invention in side view.
Figure 3:
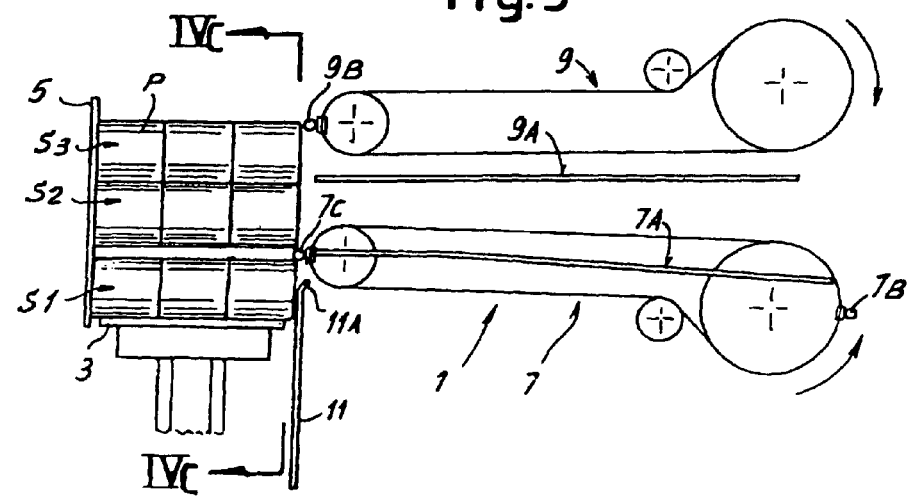

The operating cycle of the device described above is clearly understood by examining the sequences of FIGS. 1 to 3 and the sequence of FIGS. 4(*a*)-4(*c*). To obtain a package of three mutually superposed layers S1, S2, S3 of products P, in a first step (FIG. 1) the lower conveyor 7 pushes, by means of the pusher or push bar 7B, a first layer of products P onto the surface 3. This surface is located at a height approximately corresponding to the height of the front edge of the sliding surface 7A. Once the layer S1 has been placed on the stacking surface 3 the latter is lowered (arrow f3) to take the position in FIG. 2. Lowering of the stacking surface 3 preferably takes place with the compacting wall 11 in the position of FIG. 1, i.e. distanced from the volume inside which the stacking surface 3 moves. This facilitates downward movement of this surface preventing interference between the compacting wall 11 and the products P positioned on the stacking surface 3. However, it would also be possible for the wall 11 to abut on the stacking surface 3, carrying it to the position it takes in FIG. 2, even before lowering of the stacking surface 3. According to other embodiments, the compacting wall 11 is not movable and is located in the position of FIG. 2. In this case, it is advantageous to provide an inclined upper portion of the wall 11 (also indicated in FIGS. 1 to 3 with 11A, as this is advantageous also in the case of movable wall 11), to facilitate lowering of the stacking surface 3 and of the layer S1 of the products positioned thereon in the first step of the operating cycle.

Before, during or after lowering of the stacking surface 3 from the position of FIG. 1 to the position of FIG. 2, the two conveyors 7 and 9 have pushed a second layer S2 and a third layer S3 of products P into an intermediate position along the sliding surfaces 7A, 9A, by means of the transverse bar 7C of the conveyor 7 and the transverse bar 9B of the conveyor 9 respectively. The layers of products are fed to the conveyors 7, 9 in a known manner by means of an oscillating conveyor belt or other suitable device, not shown.

In the subsequent step, the movement of the conveyors 7, 9 pushes the layers S2, S3 towards the stacking surface 3, obtaining superposing of the three layers 51, S2, S3 on this surface. The position of maximum advancement of each of the three layers is defined by the wall 5.

As can be observed in FIG. 4(*a*), when the stacking surface is in the Upper position (FIG. 1, FIG. 4(*a*)), the lateral containing walls 31A 31B are reciprocally distanced by a degree such as to leave the products P of the layer S1 without lateral compression stress. This layer can therefore be lowered taking the stacking surface 3 from the height of FIGS. 1 and 4(*a*) to the height of FIGS. 2, 3 and 4(*b*), 4(*c*). After reaching the lower height the lateral walls 31A, 31B are moved reciprocally towards each other as shown in FIG. 4(*b*) so as to present a reciprocal distance D slightly lower than the transverse dimension taken by the layers S1, S2, S3 when they are in completely relaxed conditions, i.e. without being compressed laterally.

As a result of this, when the conveyors 7, 9 push the layers S2, S3 above the stacking surface 3, these layers are pushed with slight forcing and therefore slightly compressed between the walls 31A, 31B. The lateral push exerted by these walls on the products P of the layers S2, S3 generates sufficient frictional force to maintain these layers slightly raised by a distance L with respect to the layer S1 below, until the walls 31A, 31B are moved away from each other once again, allowing the layers S2, S3 to drop onto the layer S1 below. To facilitate insertion of the layers S2, S3 between the walls 31A, 31B, these walls can be suitably shaped along the front edge thereof, i.e. the edge oriented towards the conveyors 7, 9.

FIG. 4(*c*) shows the reciprocal position taken by the layers S1, S2, S3 after the two upper layers S2, S3 have been inserted with slight forcing between the walls 31A, 31B; the products of the layer S2 are slightly raised with respect to the layer S1 below. In this way, an effect of reciprocal sliding is prevented between the layers S1, S2. Moreover, the friction between the products of the layers S2, S3 and the walls 31A, 31B slows the products of these two upper layers (which are inserted at high speed as a result of the thrust of the bars of the conveyors 7, 9), preventing them from knocking violently against the wall 5 with the risk of bouncing backwards and taking a position not correctly aligned with respect to the layer S1 and to the stacking surface 3 below.

In some embodiments, after reaching the position of FIG. 3, when the walls 31A, 31B are once again moved away to make the layers S2, S3 rest on the layer S1 below and the stacking surface 3 is lifted to take the superposed layers S1, S2, S3 to a packaging position above (not shown), the conveyors 7, 9 can be controlled with an alternating movement so that the push bars 7C, 9B oscillate around the end position shown in FIG. 3.

In this way, these push bars 7C, 9B form a compacting element of the products P of the layers S1, S2, S3 preventing the risk of accidental movement of the products P during the lifting steps towards the packaging position above.

It is understood that the drawing only shows an example provided purely by way of practical demonstration of the invention, which can vary in forms and arrangements without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A device for forming layers of mutually superposed products to be packaged, comprising:
    a stacking surface in a first orientation movable in a substantially vertical direction on top of which layers of products to be packaged are superposed;
    a pair of substantially superposed conveyors arranged to feed said layers of products from a side orientation to said stacking surface onto the stacking surface; and
    a pair of substantially parallel and substantially vertical planar walls in a second orientation which is different from said first orientation of the stacking surface, between which said layers of products are inserted by said conveyors when the layers of products are stacked on said stacking surface;
    wherein said walls are reciprocally movable towards and away from each other to take a position of greater reciprocal distance, in which said walls do not interfere with the products placed on the stacking surface, and a position of lesser reciprocal distance, in which said walls interfere with the products inserted therebetween; and wherein said stacking surface, said conveyors and said walls are structured and actuator controlled in a coordinated manner to perform operations in sequence as follows:
        at least one of said conveyors depositing from said side orientation a first number of said layers of products on top of said stacking surface;
        lowering said stacking surface, with said first number of said layers deposited thereon, by a degree at least equal to a height of said first number of said layers of products, and in coordination with the walls being in said position of greater reciprocal distance so as not to obstruct lowering of the products;

moving, based on actuator control, said walls reciprocally towards each other;

inserting a second number of said layers of products from said side orientation between said walls by said conveyors, distance between said walls being actuator controlled to be in said position of lesser reciprocal distance such as to cause friction between the products and the walls; wherein said first number of layers is different from said second number of layers.

2. The device as claimed in claim 1, wherein said stacking surface is arranged to be lowered by a degree greater than the height of the layers of products deposited thereon.

3. The device as claimed in claim 1, wherein said first number of said layers of products is equal to one and said second number of said layers of products is equal to two.

4. The device as claimed in claim 2, wherein said first number of said layers of products is equal to one and said second number of said layers of products is equal to two.

5. The device as claimed in claim 1, wherein each of said conveyors comprises a sliding surface for the products and push members to push the products along said sliding surface.

6. The device as claimed in claim 5, wherein said push members comprise bars transverse to a direction of feed of the products.

7. The device as claimed in claim 6, wherein a first of said conveyors comprises double in number of said push members with respect to a second of said conveyors.

8. The device as claimed in claim 6, wherein a first of said conveyors comprises two of said push members and a second of said conveyors comprises one of said push members.

9. The device as claimed in claim 7, wherein said first of said conveyors comprises two push members and said second of said conveyors comprises one of said push members.

10. The device as claimed in claim 6, wherein at least one of said conveyors is arranged so as to compact one or more of said layers of products by movement of at least one of said push members.

11. The device as claimed in claim 1, wherein said walls and said stacking surface are arranged such that after insertion of said second number of said layers of products between said walls, said walls are arranged to move away to make the second number of said layers rest on the first number of said layers on the stacking surface to provide superposed layers; and wherein the stacking surface is lifted to take the superposed layers to a packaging position.

12. A method for stacking layers of products to be packaged, comprising steps of:

depositing a first number of layers of products coming in sideways on top of a stacking surface arranged between a pair of substantially parallel and substantially vertical planar walls, wherein said pair of said planar walls are moved so as to allow said depositing of said first number of layers of products on top of said stacking surface;

lowering said stacking surface;

depositing in sideways in a position above said first number of said layers of products, a second number of said layers of products wherein said first number of layers is different from said second number of layers, and maintaining said second number of said layers of products in a raised position above said first number of said layers of products below by a distance sufficient to prevent sliding on products below stacked on the stacking surface;

wherein said second number of said layers of products are maintained in said raised position from the first number of said layers of products by reciprocally moving said pair of said planar walls a sufficient distance in a coordinated manner such that said second number of said layers of product are inserted with interference between said pair of said planar walls as a result of friction between the products and the walls.

13. The method according to claim 12, wherein after insertion of said second number of said layers of products between said walls, said walls are moved away to make the second number of said layers rest on the first number of said layers on the stacking surface to provide superposed layers; and the stacking surface is lifted to take the superposed layers to a packaging position.

* * * * *